Aug. 12, 1930.  R. T. ROMINE  1,772,735
METHOD FOR HANDLING MATERIAL
Filed May 5, 1927  12 Sheets-Sheet 1

Inventor:
Robert T. Romine
By
Macleod, Calvert, Copeland & Dike
D2 Attorneys.

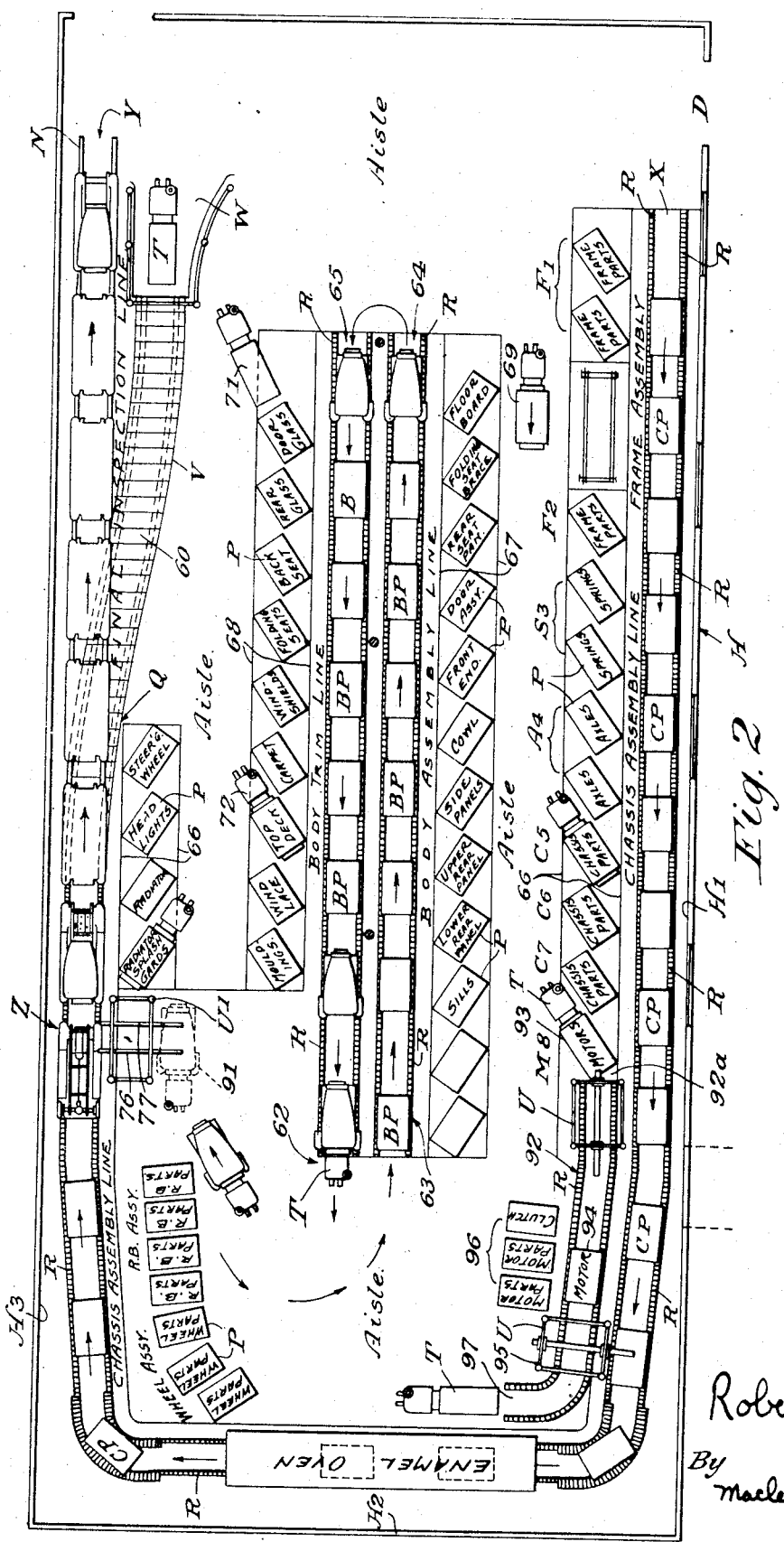

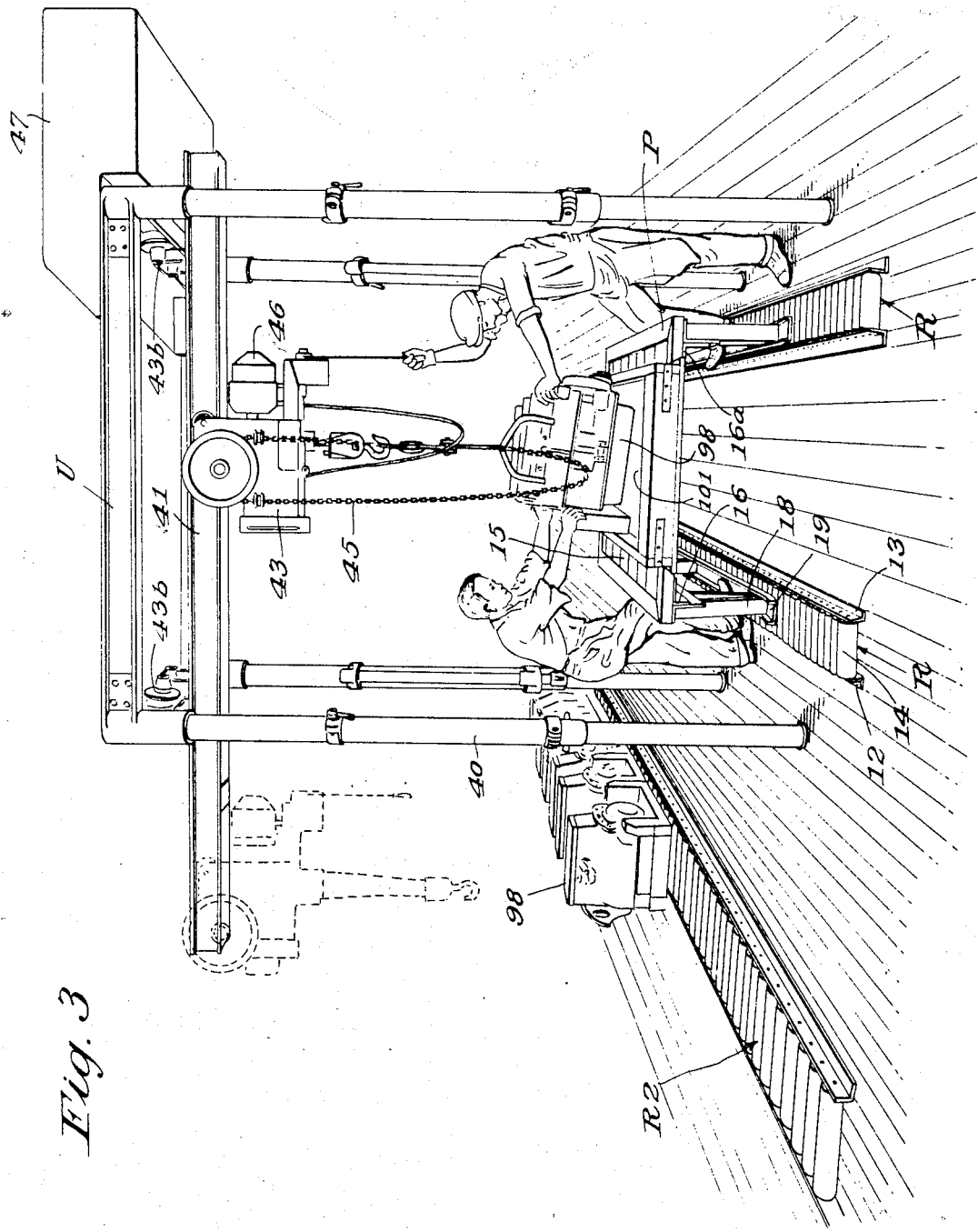

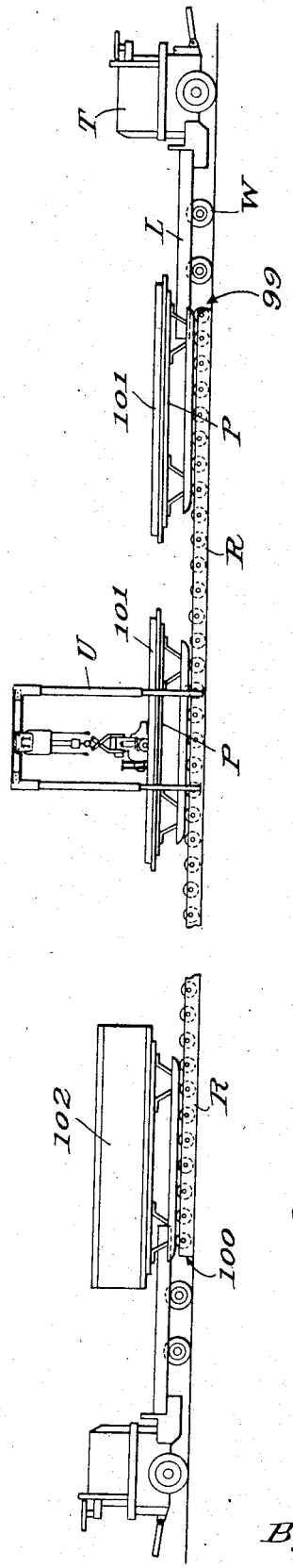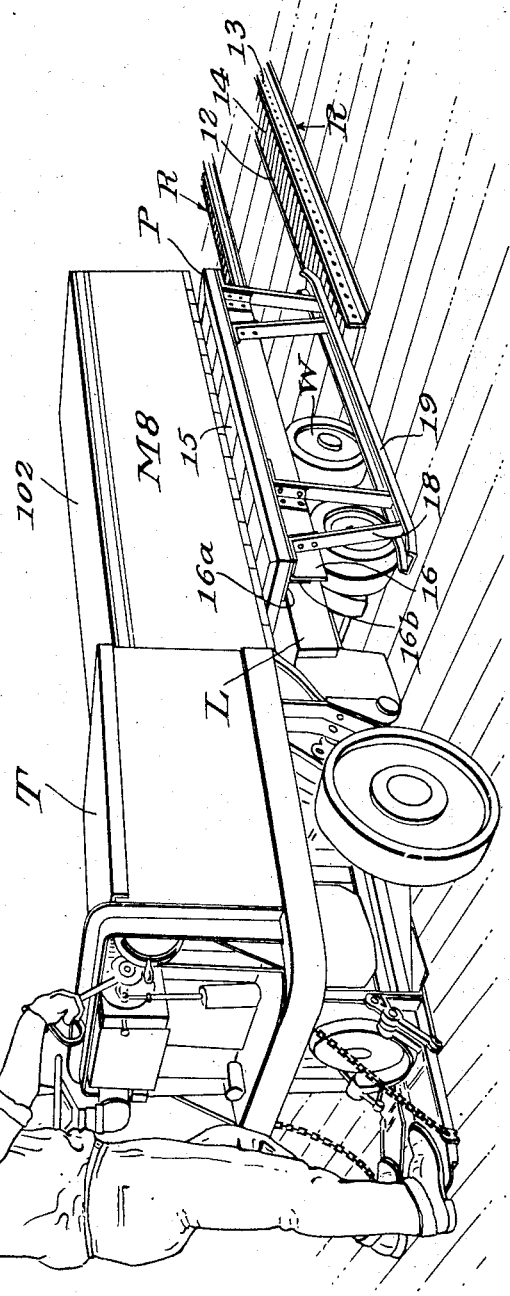

Aug. 12, 1930.   R. T. ROMINE   1,772,735
METHOD FOR HANDLING MATERIAL
Filed May 5, 1927   12 Sheets-Sheet 5
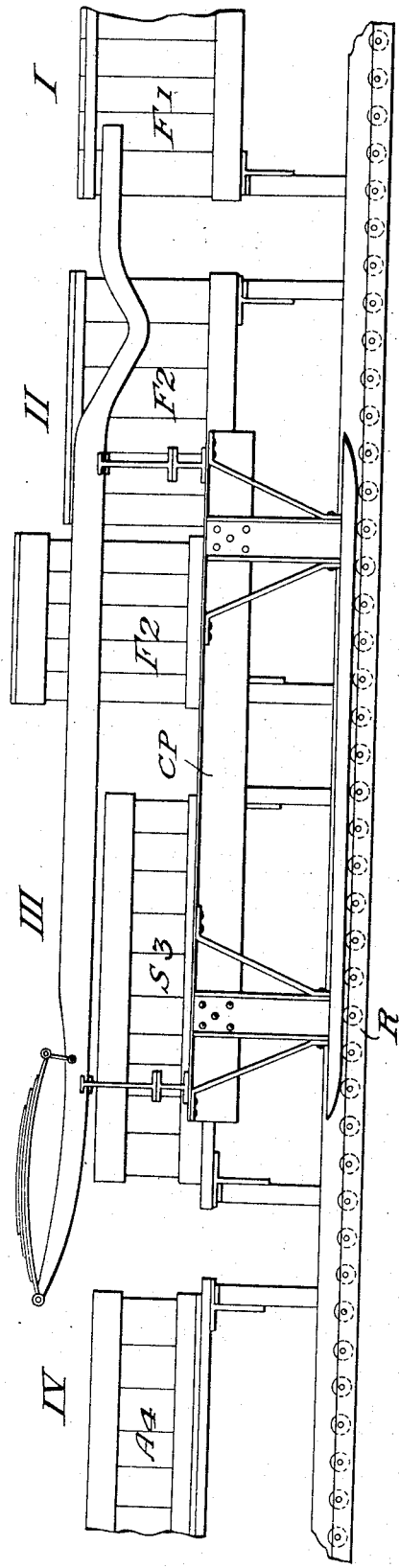
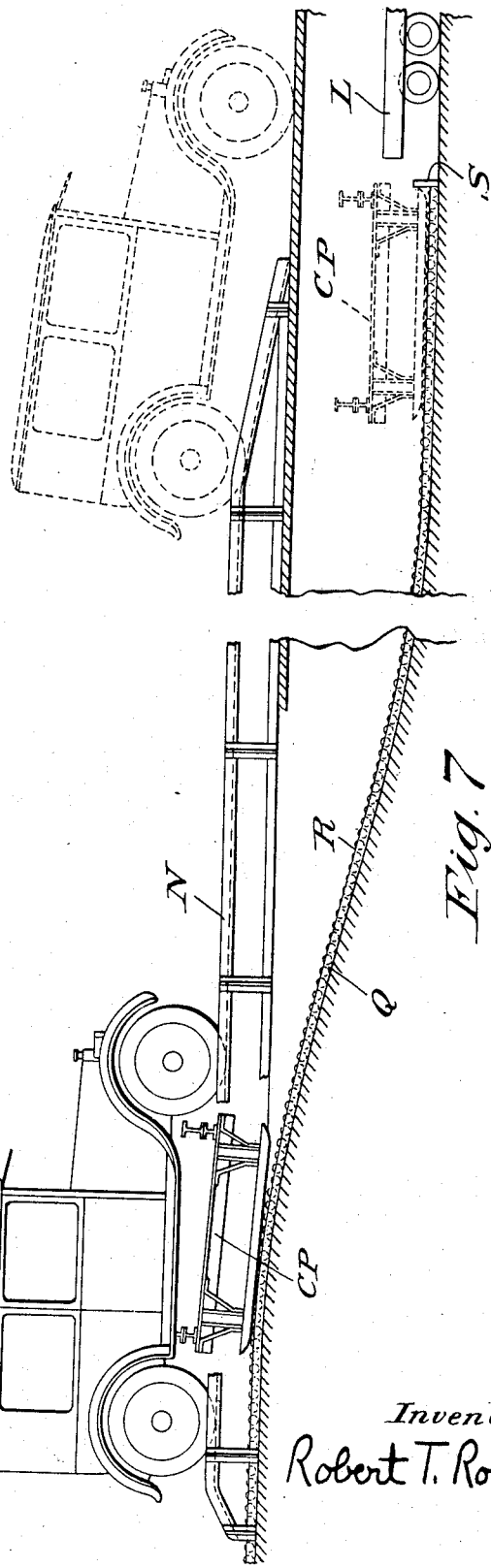
Inventor:
Robert T. Romine
By Macleod, Calver, Copeland & Dike
Attorneys.

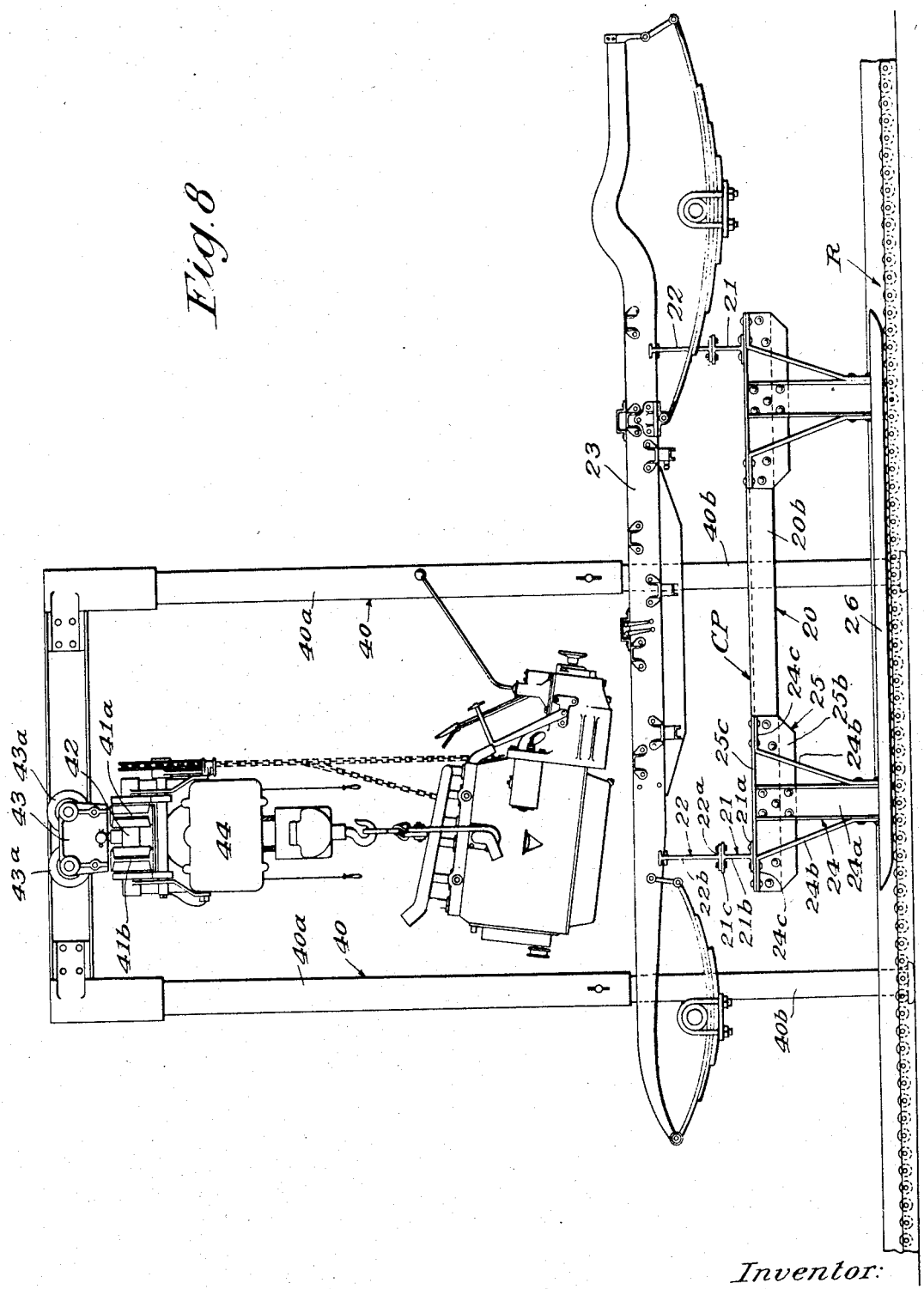

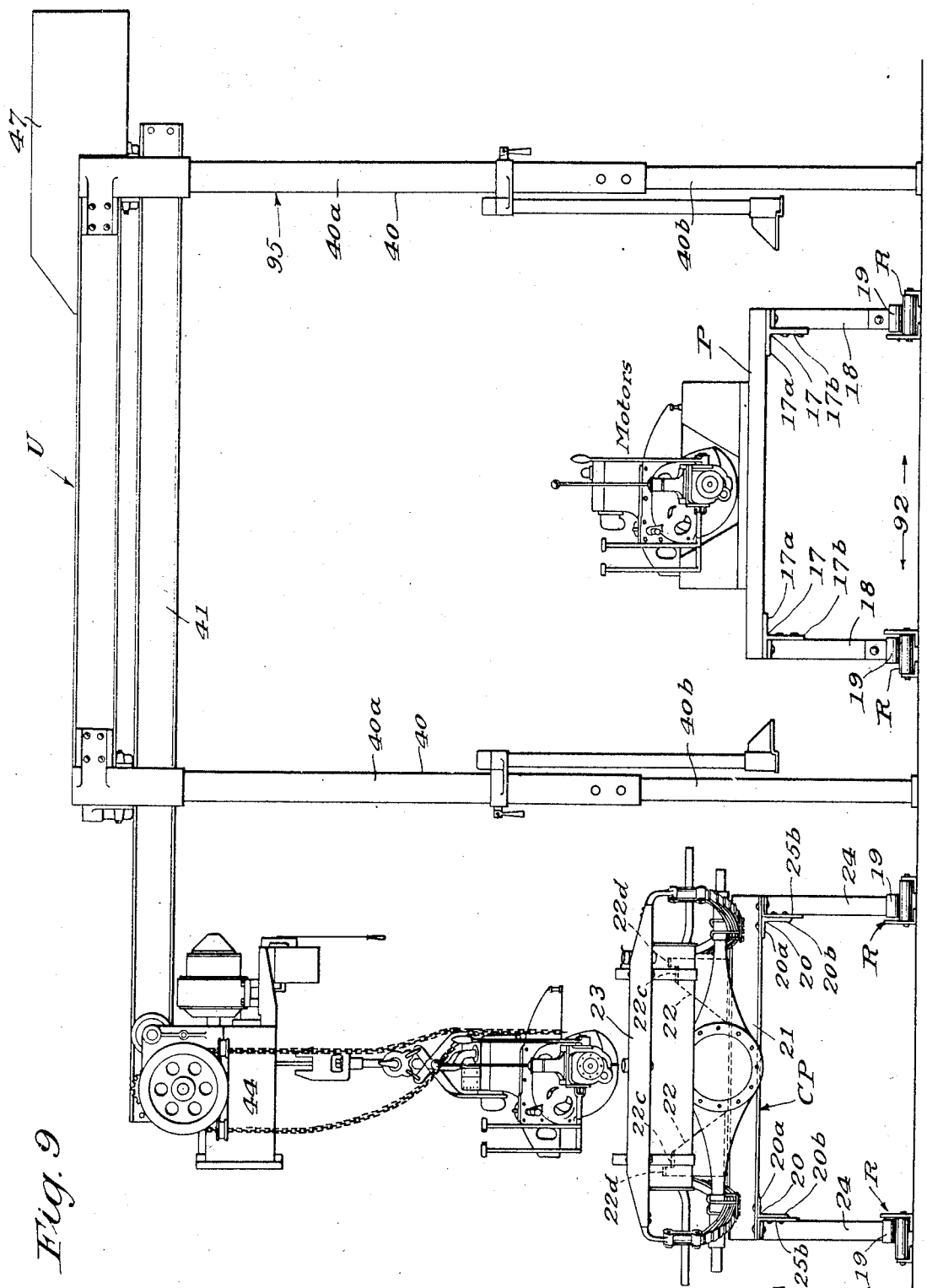

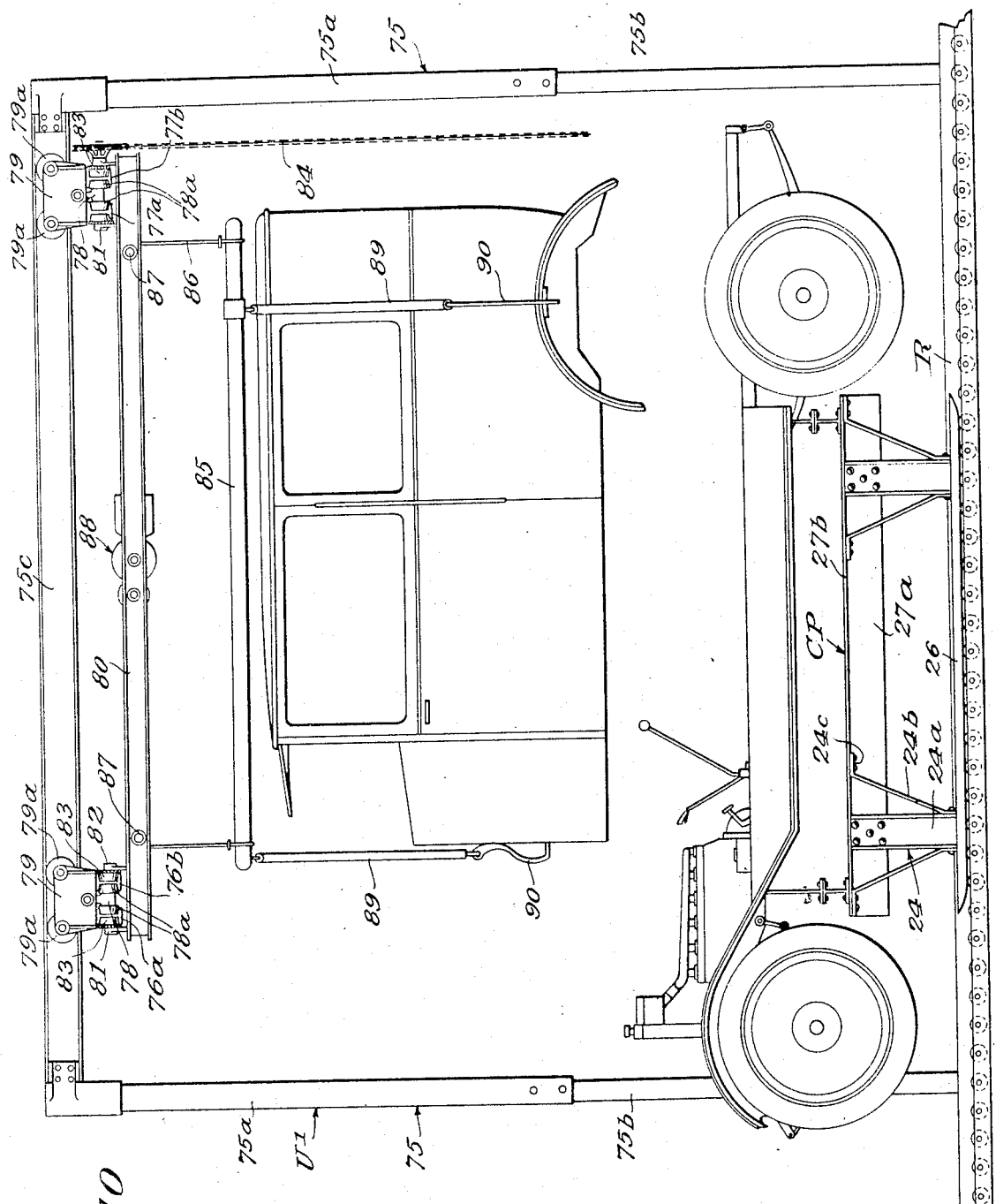

Aug. 12, 1930.  R. T. ROMINE  1,772,735
METHOD FOR HANDLING MATERIAL
Filed May 5, 1927    12 Sheets-Sheet 9
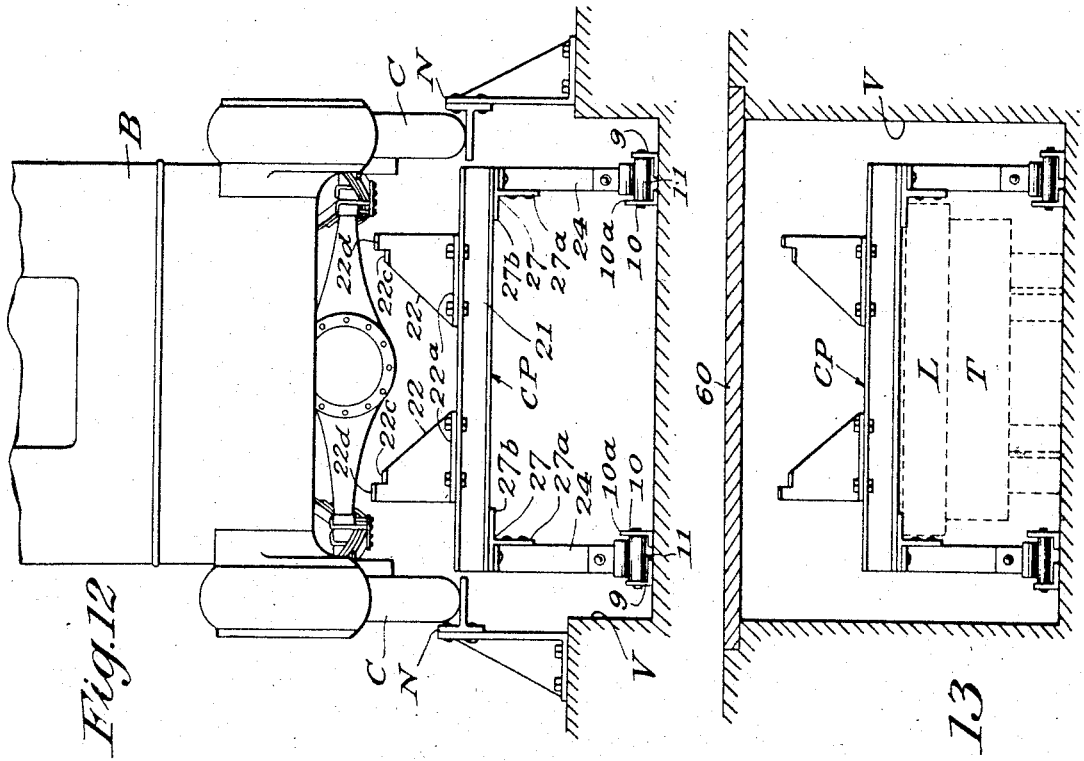
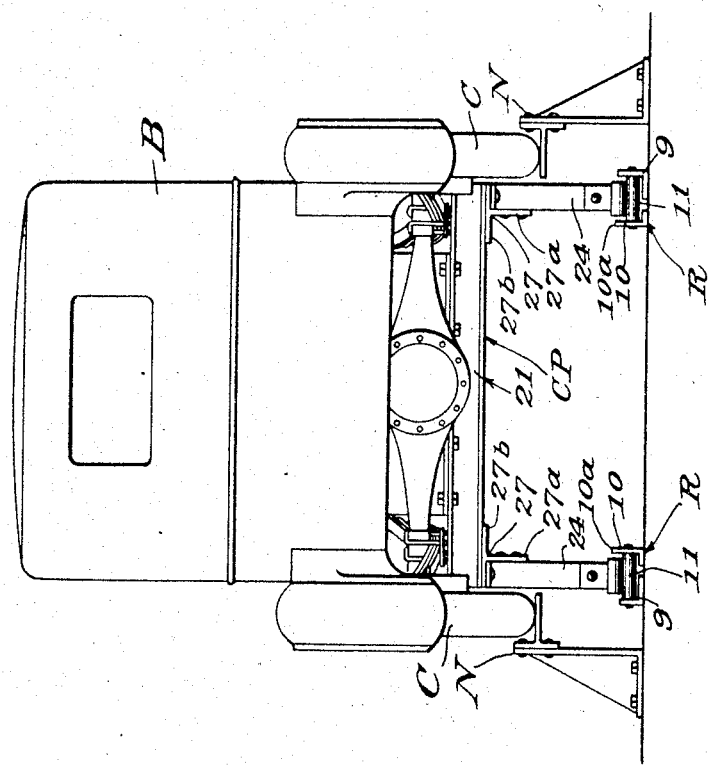
Inventor:
Robert T. Romine
By Macleod, Calver, Copeland & Dike
Attorneys.

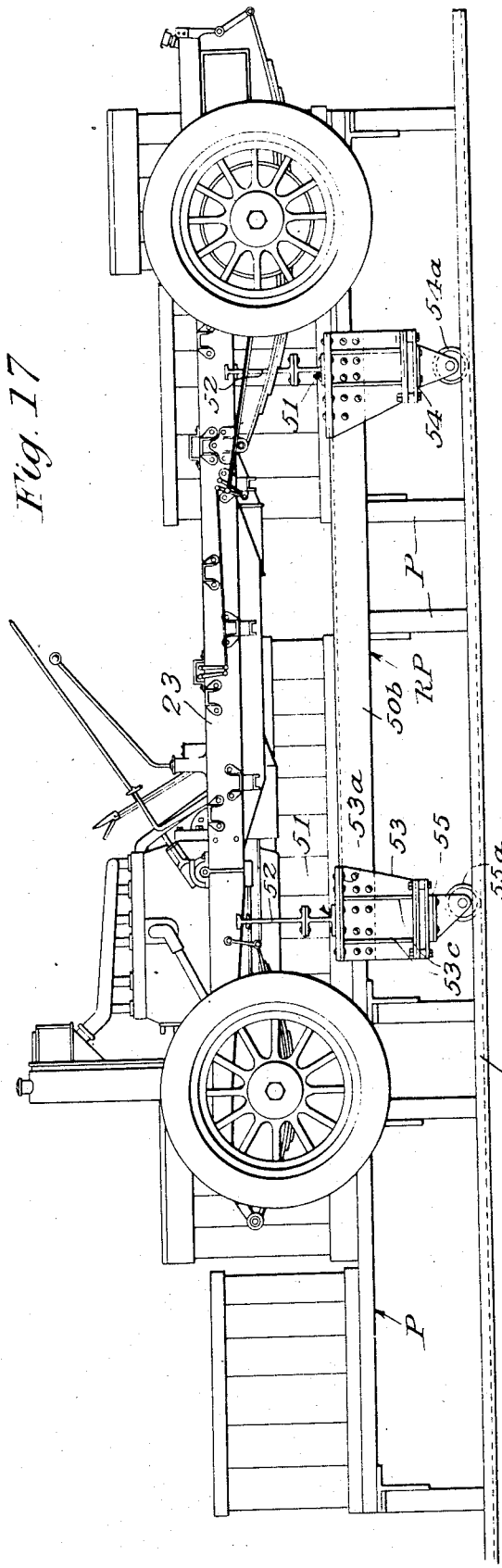
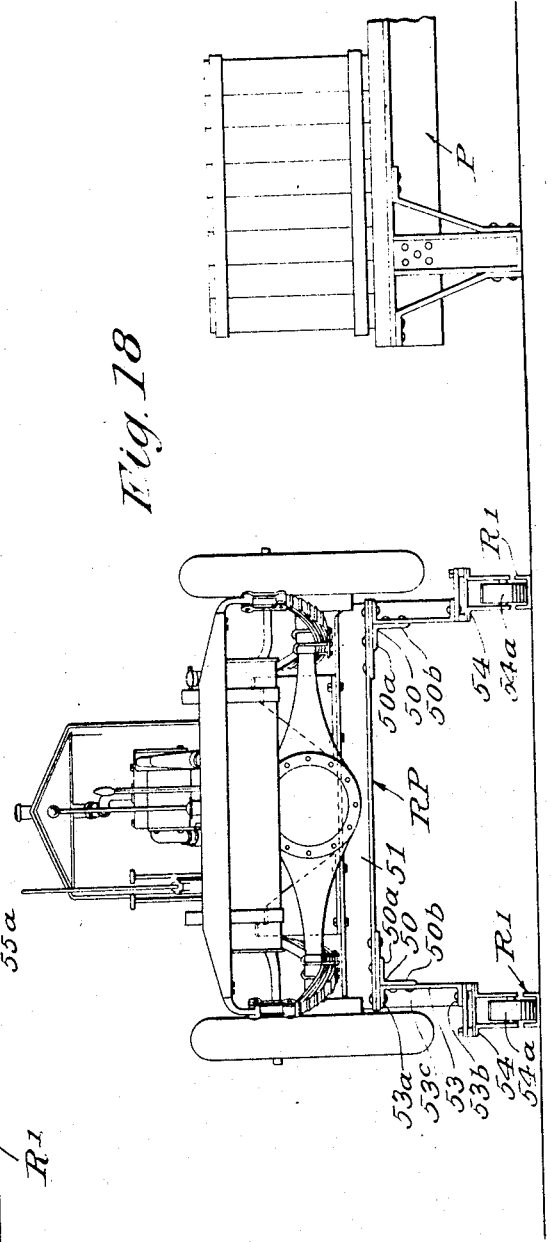

Patented Aug. 12, 1930

1,772,735

UNITED STATES PATENT OFFICE

ROBERT T. ROMINE, OF MOUNT CLEMENS, MICHIGAN

METHOD FOR HANDLING MATERIAL

Application filed May 5, 1927. Serial No. 189,136.

This invention relates to a method particularly, although not exclusively, adapted for use in the assembling of machines or assembled units such, for example, as automobiles, cars, machinery, etc., one of the objects of the invention being to provide a method whereby the assembling of cars or machines or the like may be greatly facilitated, labor costs in both material handling and assembly operations reduced, plant and plant equipment costs materially reduced, and production increased without correspondingly increasing the overhead and operating costs as is the case in present day methods.

One of the important features of the invention resides in the fact that it enables an assembly plant, such for example as an automobile assembly plant, to be built and equipped at at least one-fifth the cost heretofore necessary for a given production per day. The invention eliminates the necessity of an expensive plant structure, reduces to a minimum the floor space necessary for a given output, requires merely a single story structure with a ground floor for all operations, eliminates the necessity of costly power driven conveyors, overhead cranes, and other fixed installations heretofore necessary in plants for assembling cars or automobiles. It eliminates a large proportion of the labor costs heretofore required in handling, loading and unloading material. Another important feature of the invention is that the method may be carried out advantageously by means of a few relatively simple mechanical units which provide an apparatus capable of maximum flexibility and adaptability in readily meeting varying manufacturing requirements, changes in production schedules, and changes in the location, position or length of assembly lines or sub-assemblies.

Other objects and advantages of this invention will appear in the following description and appended claims, reference being had to the accompanying drawings forming a part of this specification wherein like reference characters designate corresponding parts in the several views.

Fig. 2 is a view similar to Fig. 1 illustrating certain modifications of the invention.

Fig. 3 is a perspective view showing the way in which material or parts may be assembled and crated for shipment to the assembly plant.

Fig. 4 is a diagrammatic side elevation, partly broken away, illustrating the method of assembling material or parts in boxes for shipment.

Fig. 5 is a fragmentary perspective view illustrating one step in the method of assembling parts or material for shipment.

Fig. 6 is a fragmentary side elevation illustrating a part of the apparatus and one of the steps in assembling, for example, an automobile.

Fig. 7 is a fragmentary diagrammatic side elevation showing the final step in the assembly of an automobile.

Fig. 8 is a fragmentary side elevation showing a part of the assembly line at an intermediate stage in the assembly of the car.

Fig. 9 is an end elevation illustrating the stage in the assembly shown in Fig. 8.

Fig. 10 is a fragmentary side elevation of the assembly line illustrating diagrammatically certain steps in the sequence of operations.

Fig. 11 is an end elevation showing the point on the assembly line where the assembly operation is completed and the chassis platform or buck is ready to be discharged from beneath the completed car.

Figs. 12 and 13 are transverse sectional elevations illustrating successive steps in the discharge of the chassis platform or buck from beneath the completed car.

Fig. 17 is a fragmentary side elevation at one point on the assembly line but illustrating a modification of the conveyor apparatus of the invention.

Fig. 18 is a fragmentary end elevation of the apparatus shown in Fig. 17.

Figure 1:
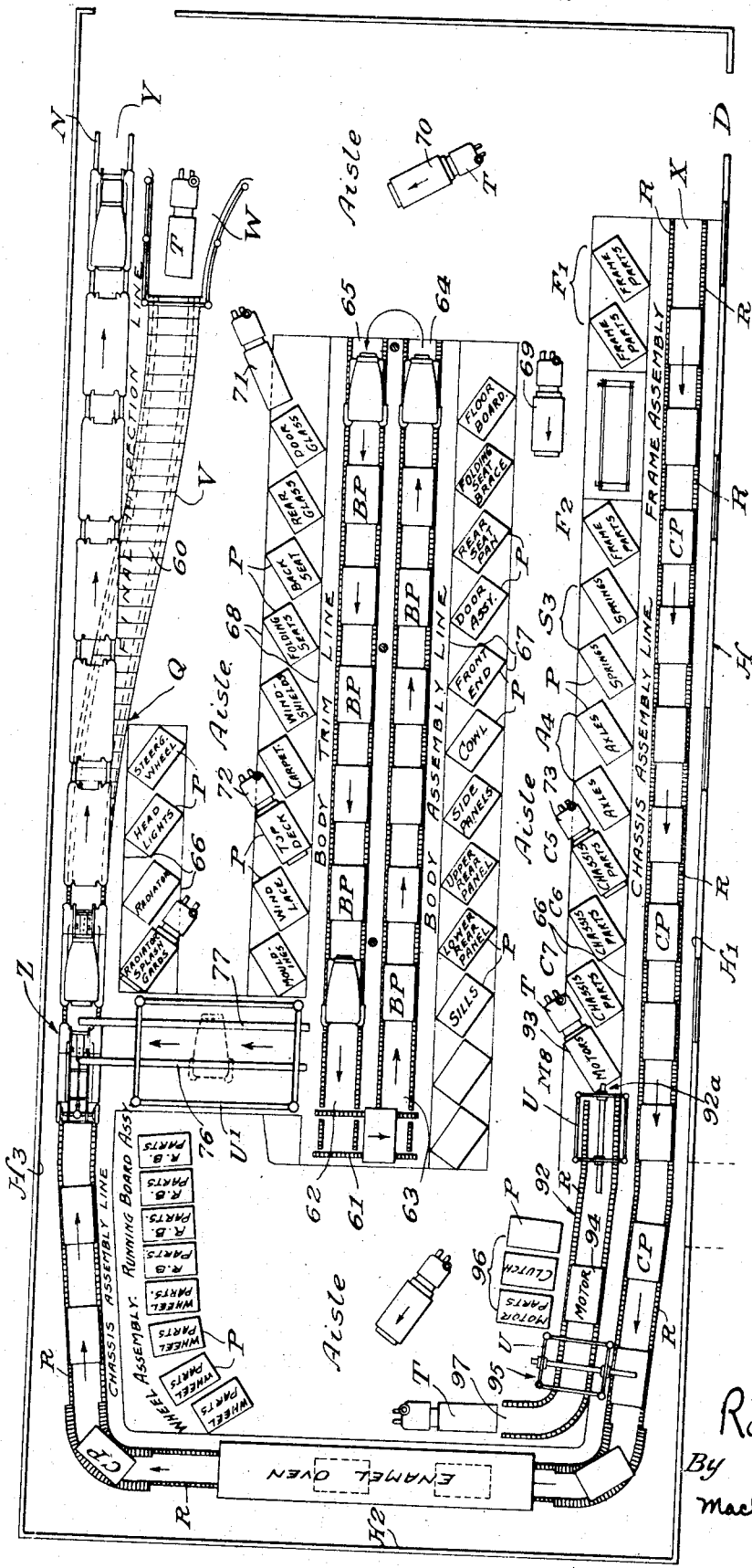
Fig. 1 is a diagrammatical plan view illustrating an assembly plant constructed and laid out in accordance with my invention.

Before explaining in detail the present invention and the method or mode of operation embodied therein, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

The invention has been illustrated by way of example as applied to the assembling of automobiles, although it is, of course, adapted to be applied in the assembly of other types of machines, cars, machinery units, etc., and for the purpose of simplifying the description herein, the term "car" or "machine" where used is understood to mean any such assembled unit.

In applying the invention to the assembling of automobiles the description herein may be considered more readily under the following sub-divisions, the present application of the invention being shown where the parts are manufactured or made at one point or place and shipped or transported to another place for assembly, although this is not essential and the invention is not limited to this feature:

1. The conveyor and assembly apparatus, comprising a description of the mechanical units forming the apparatus.

2. Assembly plant construction, comprising a description of the assembly lines.

3. Sequence method of boxing or packing assembly parts at point of manufacture and distribution of the parts at the assembly plant.

4. Assembling of the car, including the chassis unit and the body unit in the case of automobiles.

*The conveyor and assembly apparatus*

The conveyor apparatus of the present invention preferably comprises three main mechanical units, namely: 1, a conveyor way or trackway such as spaced parallel sections of gravity or anti-friction rollers; 2, a series of portable platforms adapted to cooperate with the conveyor way so that the platforms may move in succession thereon in a predetermined path; and 3, one or more lift trucks adapted to deposit the platforms at the entrance end of the conveyor and adapted to remove the platforms at the exit end of the conveyor. The portable platforms for use as a cooperative part of the conveyor apparatus may be constructed in various ways depending upon the particular purposes or functions to be accomplished. In the present application I have illustrated a portable platform or assembly buck embodying certain improved features of construction specially adapted to facilitate the assembly of the chassis of an automobile thereon. I have also shown the portable platform or buck specially adapted for the purpose of assembling an automobile body thereon. In addition I have shown a portable platform adapted for use in combination with the other units of the conveyor apparatus in connection with the handling and packing of the parts or material at the place of manufacture, and for carrying the material or parts and depositing the same at the required points along the assembly line.

In addition to the foregoing units of the apparatus I preferably provide a portable crane or stack lifter U of special construction adapted to handle heavy units, such as cylinder blocks in the case of automobile assembly, or automobile bodies, etc. These units of the apparatus may be placed at predetermined points along the assembly or sub-assembly lines to transfer material from point to point, thereby eliminating considerable manual labor and time, obviating the necessity of fixed overhead crane installations and providing a readily portable unit which can be moved from point to point on the lift platform of a power driven lift truck.

The conveyor apparatus preferably embodies the use of the gravity roll sections with portable platforms having runners or skids to travel thereon, such as shown in Figs. 3, 4, 6, and 8. The conveyor way or trackway may, however, be constructed the reverse of this preferred form as shown in Figs. 17 and 18. In this modified form the conveyor way or trackway may comprise channel ways, and the platforms may be provided with casters travelling therein, as will be more fully described later.

*Gravity or anti-friction roller sections.—* As shown in Figs. 6 to 8 inclusive, 9 to 13 inclusive and 16, the conveyor ways or tracks over which the portable platforms or bucks are caused to travel in succession to permit the chassis or the body of the car to be assembled, comprise in the preferred form spaced parallel sections of gravity or anti-friction rolls R. The sections of each track or guideway may be of any suitable length and are positioned end to end and held in proper alignment. Each section may comprise a pair of angle bars 9 and 10 having horizontal flanges extending inwardly and secured to the floor. The vertical flanges of the angle bars are suitably spaced apart and journalled therein are a series of anti-friction rollers 11 forming a continuous anti-friction surface. The vertical flanges of the inner angle bars 10 of the parallel sections may be extended so as to provide guides for the legs of the portable platforms and to maintain them in position on the conveyor sections.

In the construction shown in Figs. 3 to 5 inclusive the anti-friction roller sections R may be constructed in the following manner; the angle bars 12 and 13 are suitably spaced apart and the vertical flanges thereof support the rollers 14. The lower horizontal flanges of the angle bars are turned outwardly and may be secured to the floor. In this instance the gravity roll sections are not provided with guides for the platform, since this is not essential.

*Portable platforms P.*—The platforms P shown in Figs. 3 to 5 inclusive, 9 and 18 comprise a load supporting floor 15 which may be formed of a series of cross boards. Beneath the floor at each longitudinal side is located a T-shaped truss member which may be constructed in the form of a pair of angle bars 16 positioned back to back as in Figs. 3 to 5, or an integral T-shaped bar as shown at 17 in Fig. 9. Suitable legs 18 are mounted at the outer sides of the vertical flanges of the truss members, and each pair of legs at each side of the platform is connected by means of a guide runner or skid 19. This runner may be in the form of a channel bar embracing the lower ends of the legs and adapted to travel freely over the anti-friction rollers. The vertical flange $16^b$ (Fig. 5) or $17^b$ (Fig. 9) of the truss members 16 or 17 provide spaced guides for the lift platform L of the lift truck T when introduced between the legs 18 of the platform. The inwardly extending horizontal flange $16^a$ (Figs. 3 and 5) or $17^a$ (Fig. 9) assist in supporting the floor and overlie the truck platform so as to receive and distribute the full length of the platform floor the upward thrust of the lift truck platform.

*Chassis assembly platform CP.*—The portable platform CP upon which the chassis of the car is assembled preferably comprises a load supporting floor or top of skeleton construction, permitting the workmen to stand and work between the sides and ends of the platform. Referring to Figs. 8 and 9, the chassis assembly platform CP comprises a rectangular frame, substantially the entire space between the marginal frame members being open to permit the operators to stand therein during the assembly of the machine. This frame may comprise a pair of spaced longitudinal angle bars 20 (Figs. 8 and 9) which are connected together at opposite ends of the platform or buck by means of structural I-beams or members 21 mounted thereon, the frame members 20 and 21 being riveted together to form a rigid supporting frame. It will be particularly noted that the transverse frame members 21 (see especially Fig. 9) are mounted on top of the inwardly extending horizontal flanges $20^a$ of the angle bars 20, and the members 21 have a bottom horizontal flange $21^a$ (see Fig. 8) riveted to the angles 20, a vertical central web $21^b$, and a top horizontal flange $21^c$. The flange $21^c$ provides a flat supporting surface for vertical brackets 22 constructed to support the chassis sills 23. Four of the brackets or supports 22 are provided, two at each end of the platform mounted on the transverse frame members 21. Each bracket comprises a bottom horizontal flange $22^a$ bolted to the flange $21^c$, an upwardly extending web $22^b$, and terminates at its upper end in a notched portion $22^c$. The notched portion provides a rest for the bottom of the chassis sill 23 and also a projecting abutment $22^d$ adapted to engage the side of the sill 23 and prevent lateral movement or displacement thereof. From this construction it will be seen that each chassis sill 23 is releasably supported on a pair of brackets 22 each constructed to maintain the sills against sidewise displacement during the assembly operations.

The portable platform CP shown in Figs. 8 and 9 also comprises a pair of supporting legs 24 at each side of the platform. Each leg is secured to the vertical flange $20^b$ of the angle truss 20 through the medium of a pressed steel gusset plate 25. Each gusset plate comprises a vertical flange $25^b$ positioned back to back with the flange $20^b$ and an outwardly extending flange $25^c$ at its upper end which assists in supporting one of the transverse members 21 and is riveted thereto. Each leg 24 comprises a vertical channel bar $24^a$ having a central web thereof riveted to the flange $25^b$ of the gusset plate and also to the vertical guide flange $20^b$ of the angle 20. Each leg also may comprise brace bars $24^b$ secured at the lower end thereof to the lower end of the channel leg and bent upwardly and outwardly and provided with horizontal attaching portions $24^c$ riveted to the under side of the flange $25^c$ of the gusset plate. The lower ends of each pair of legs 24 at each side of the platform are joined by means of a lengthwise extending channel-shaped runner 26 preferably of the same construction as the channel runner 19 above described, and adapted to travel freely on the gravity roll sections R.

Referring to Figs. 10 to 13 inclusive, the chassis assembling platform CP in this instance comprises spaced lengthwise extending T-bars 27 instead of the angle bars 20 and gusset plates 25 shown in Figs. 8 and 9. In this embodiment of the invention the T-bars 27 form longitudinal frame members upon which are supported and secured the transverse frame members 21. The legs are mounted at the outer sides of the vertical guide flanges 27ª of the T-bars, the channel portion 24 of each leg being riveted to the flange 27ª and the V-shaped brace members 24ᵇ being secured to the outwardly extending horizontal flange 27ᵇ of the T-bar. The construction of this form of chassis assembly platform otherwise is the same as the construction shown in Figs. 8 and 9.

It will be noted that the chassis assembly platform CP as in the case of the platform P above described is constructed for use with a lift truck T. The lift platform L of the truck T may be introduced between the legs 24, and will be guided into proper position by means of the vertical guide flanges 20ᵇ (Figs. 8 and 9) or 27ª (Figs. 10 to 13 inclusive). When the truck platform L is lifted or elevated to pick up the platform or buck CP and its load to transport them the upward thrust of the truck platform L will be taken by the inwardly extending flanges 20ª (Fig. 9) or 27ᵇ (Figs. 10 to 13 inclusive) which act as trusses to distribute the load the full length of the platform or buck CP.

Figure 14:
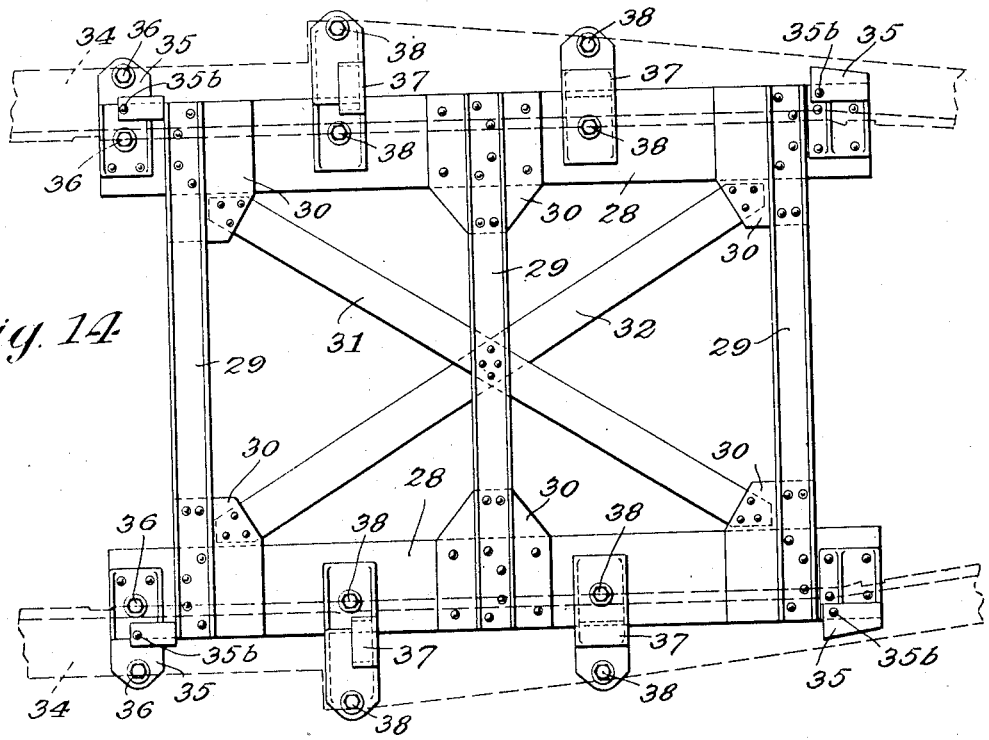
Fig. 14 is a plan view of the platform or buck upon which the chassis is assembled.
Figure 15:
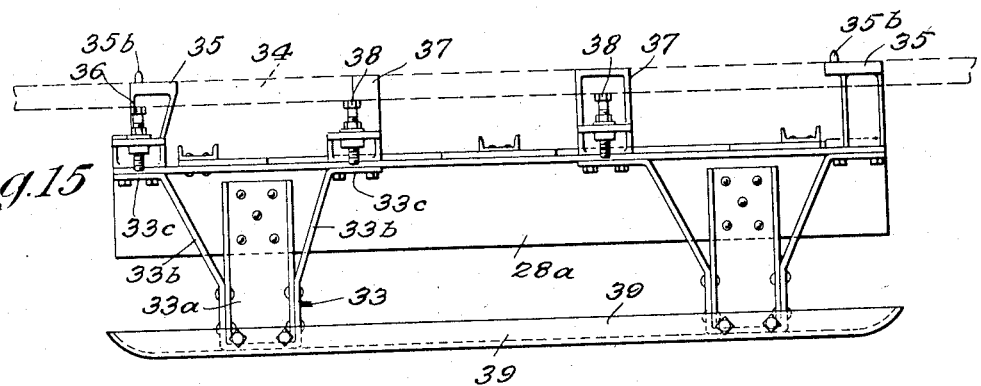
Fig. 15 is a side elevation thereof.
Figure 16:
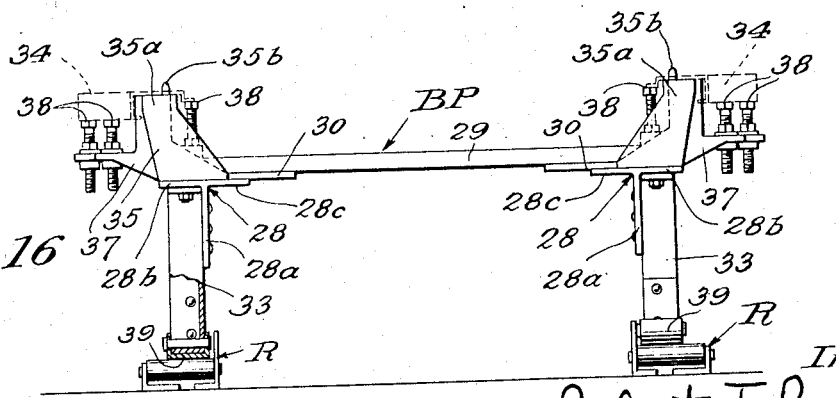
Fig. 16 is an end elevation thereof partly in section.

*Body assembly platform BP.*—Referring to Figs. 14 to 16 inclusive, the body of the car may be assembled on a portable platform or buck BP. This platform also comprises a floor or top portion of skeleton construction which is supported at opposite longitudinal sides upon lengthwise extending T-bars 28. Each T-bar, as in the case of the chassis platform CP above described, and the portable platform P, comprises a downwardly extending vertical flange 28ª forming a guide for the lift platform of a truck when introduced beneath the platform and also forming means for attaching the legs thereto. Each T-bar also comprises integral outwardly and inwardly extending horizontal flanges 28ᵇ and 28ᶜ, respectively, providing a supporting surface for the transverse frame members of the platform. The inwardly extending flanges 28ᶜ also provide means for receiving and distributing the upward thrusts of the truck platform when introduced between the guide flanges 28ª and elevated to lift and carry the platform with its load. The top or floor of the platform BP comprises a plurality of parallel transverse channel members 29 which are secured to the flanges 28ᵇ and 28ᶜ of each T-bar through the medium of suitable gusset plates 30. The gusset plates 30 at the four corners of the platform may be connected together by means of diagonally extending tie bars 31 and 32 which are also riveted at their point of intersection to the central channel member 29 as shown in Fig. 14.

The platform or buck BP is supported at each side by means of a pair of legs 33. Each leg may comprise a vertical channel bar 33ª riveted to the outer side of the flange 28ª, and also a V or U-shaped brace member comprising a flat steel bar bent to embrace the lower end of the channel 33ª and having outwardly and upwardly bent portions 33ᵇ provided at their upper ends with bent attaching portions 33ᶜ bolted to the flange 28ᵇ.

The platform or buck BP is provided at each side with a series of upstanding brackets upon which the body sills 34 are mounted and held in position during the assembly operations. The body sills are shown in dotted lines in Figs. 14 to 16 inclusive. At each corner of the buck is mounted a bracket 35 shaped to receive the body sill. The central portion 35ª of the bracket is provided with a projecting centering pin 35ᵇ which extends through a hole in the sill 34 and maintains it in proper position. At each side of this centering pin each bracket 35 is provided with an adjusting screw 36 upon which a portion of the sill is supported. The adjusting screws 36 may be adjusted so as to level the sill and are provided with lock nuts to fix the adjustment. Intermediate the corner brackets 35 of the platform are located additional upstanding brackets 37 also constructed to support a portion of the body sill 34 and each of these brackets is provided with adjusting screws 38 for maintaining the body sill in level position. To permit the body platform BP to travel over the sections of gravity rolls R, the lower ends of the legs 33 are connected at each side of the platform by means of detachable channel-shaped runners 39, this construction being substantially the same as above described in connection with the portable platform P and the chassis assembly platform CP.

From the foregoing it will be noted that each of the portable platforms or bucks P, CP and BP upon which the material or parts are boxed, (Figs. 3 to 5 inclusive) or upon which the chassis of the car and the body of the car are assembled, is constructed to permit the lift platform L of a lift truck T to be introduced between the legs and beneath the supporting floor or frame of the platform or buck. Each of these portable platforms may therefore be picked up on the lift platform L of the electric truck and transported from point to point. Where the portable platform P is used for assembling parts in boxes for shipment, as shown in Figs. 3 to 5 inclusive, or for supporting the parts along the assembly line, as shown in Figs. 6, 9 and 18, the platform may be provided with a solid floor made up of a number of cross boards 15. Where the portable platform P, as shown in Figs. 3 to 5 inclusive and 9, is to be used in connection with the sections of gravity rolls, the platform is preferably provided with spaced runners 19 adapted to travel on the gravity rolls. Wherever the platforms are not used with the gravity rollers the channel runners or skids 19 may be detached or omitted as shown on the right in Fig. 18 and also in Fig. 17.

*Portable stack lifter U.*—Referring to Figs. 3, 8 and 9, a portable stack lifter may be employed in connection with the assembly operations. This stack lifter or crane in general may comprise an arch-shaped frame having spaced leg supports 40, each preferably comprising relatively slidable telescopic sections 40ª and 40ᵇ permitting the height of the stack lifter to be varied. Extending longitudinally beneath the top of the stack lifter and between the spaced pairs of legs is located a traversing boom 41, preferably in the form of a pair of parallel spaced connected I-beams 41ª and 41ᵇ, see Fig. 8. This boom is adapted to travel longitudinally on trolleys 42 (Fig. 8) which support the boom at opposite ends of the frame, each comprising trolley wheels cooperating with the inner flanges of the I-beams 41ª and 41ᵇ. Each trolley 42 is suspended from and swiveled to a trolley 43 at each end of the frame. Each trolley 43 has two pairs of trolley wheels 43ª (Fig. 8) and 43ᵇ (Fig. 3) which embrace opposite sides of one of the transverse I-beams of the frame and travel on the flanges thereof. This construction permits the boom 41 to be shifted lengthwise, sidewise and also to swing laterally within the arched frame. Mounted on the boom is a hoisting unit 44, including an electric motor and hoist hook, carried by trolleys permitting the hoisting unit to be shifted longitudinally of the boom. Operating mechanism is provided for shifting or propelling the unit 44 along the boom, this mechanism being controlled by a chain fall 45. The hoisting unit 44 has a depending hoist block and hook by means of which a load may be connected thereto, hoisted, transferred to any point along the boom and deposited. The hoisting unit is operated by means of an electric motor 46 supplied with power from a battery mounted in a housing 47. A detailed description of the stack lifter U is not deemed necessary herein, since the same is fully described in my co-pending applications Serial No. 129,139, filed August 14, 1926, and Serial No. 165,379, filed February 2, 1927.

*Chassis assembly platform RP.*—Referring to Figs. 17 and 18 I have illustrated a modified form of portable platform or buck upon which the chassis of the automobile may be assembled. As in the case of the chassis platform CP above described, the platform or buck RP comprises a load supporting floor of skeleton frame construction. This frame comprises a pair of spaced longitudinal truss members, angular in cross section, such as angle bars 50 which are connected at opposite ends by means of structural I-beams or members 51 mounted thereon. Mounted on the upper horizontal flanges of the bars 51 are upstanding brackets 52 upon which the sills 23 of the chassis are supported. The above parts 50 to 52 inclusive are identical with the corresponding parts 20 to 22 inclusive of the above described platform or buck CP.

Riveted to the outer side of the vertical flange 50ᵇ of each member 50 adjacent each end thereof is a pressed steel gusset plate 53 having an upper out-turned horizontal flange 53ª which assists in supporting the frame bar 51 and having a bottom out-turned horizontal flange 53ᵇ. The flanges 53ª, 53ᵇ, and the vertical web of the gusset plate are integrally joined by means of strengthening webs 53ᶜ.

Secured to the bottom of the flange 53ᵇ of each gusset plate is a caster wheel structure, a pair 54 at the rear end of the platform and a pair 55 at the forward end thereof, which include casters 54ª and 55ª respectively. In the present instance the front caster wheels 55ª are swiveled so as to turn freely, while the rear caster wheels 54ª are fixed against turning. Both sets may, if desired, be swiveled, the construction in either case permitting the platform or buck RP to negotiate curves or turns during its travel.

It will be particularly noted, see Fig. 18, that the caster wheel structures 54 and 55 are each mounted outside the vertical plane of the guide flanges 50ᵇ, and each caster wheel 54ª and 55ª is offset outwardly from the leg or gusset members 53. The wheels 55, therefore, are free to turn into any position without projecting inwardly beyond the plane of the guide flanges 50ᵇ, so that when the lift truck platform L is propelled between the guides 50ᵇ it will at no time strike the caster wheels and damage the same.

The conveyor apparatus of Figs. 17 and 18 is simply the reverse of the preferred form above described where the conveyor ways or tracks comprise spaced roller sections and the legs of the platform CP or BP travel thereon. In this instance the conveyor ways or tracks comprise spaced channel ways R¹ and the rollers or casters 54ª and 55ª of the buck RP travel therein in a pre-defined path along the assembly line. These channel ways permit the introduction of the lift truck platform L therebetween at the entrance and exit ends of the conveyor to permit the truck either to deposit the buck RP in the channel ways at the entrance, or lift and carry it from the exit end of the conveyor.

*Portable stack lifter U¹.*—As shown in Fig. 10 I have provided a portable stack lifter or crane U¹ especially adapted for the purpose of handling automobile bodies. This stack lifter in many respects is similar to the stack lifter or crane U above described, comprising in general an arched frame of the desired dimensions to permit the car body to be conveyed between the leg supports 75 thereof. Each leg support comprises relatively slidable telescopic sections 75ᵃ and 75ᵇ permitting the height of the crane to be varied as desired. Extending longitudinally between the spaced pairs of legs 75 are a pair of parallel traversing booms 76 and 77 (Figs. 1 and 2) each preferably in the form of a pair of parallel spaced connected I-beams 76ᵃ, 76ᵇ and 77ᵃ, 77ᵇ respectively (Fig. 10). Each boom 76 and 77 is adapted to travel longitudinally on a pair of trolleys 78 which support the boom at opposite front and rear ends of the arched frame. Each trolley 78, four being provided, comprises pairs of trolley wheels 78ᵃ cooperating with the opposed inner flanges of the I-beams 77ᵃ and 77ᵇ. Each trolley 78 is suspended from and swiveled to a trolley 79 at each front and rear end of the frame. The several trolleys 79 each comprises two pairs of trolley wheels 79ᵃ which embrace opposite sides of one of the transverse I-beams 75ᶜ of the frame and travel transversely on the flanges thereof. This construction permits the booms 76 and 77 to be traversed longitudinally, laterally and also to swing laterally within the arched frame.

The booms 76 and 77 are connected together by means of a hoist frame 80, substantially rectangular in construction. The frame at opposite sides carries upstanding brackets 81 and 82 carrying short shafts upon which are mounted trolley wheels 83 embracing opposite sides of each boom 76 and 77 and traveling thereon. The hoist frame 80 may be shifted independently along the booms 76 and 77 by means of suitable mechanism such as shown and described in my above mentioned application Serial No. 165,379, filed February 2, 1927, operated by means of a chain fall 84.

In handling automobile bodies a spreader frame 85 may be provided, which is raised and lowered relatively to the frame 80 by means of cables 86 traveling over idlers mounted at 87 and operated by means of electrically controlled hoist mechanism generally designated at 88. Suspended from the frame 85 are rods 89 having hooks 90, three being preferably provided in the case of automobile bodies, two to be hooked into the rear of the body and one at the front.

In Figs. 1 and 2 I have illustrated two types of lifters U¹, one having a short frame and the other a long frame, depending upon the preferred method employed in effecting the transfer of the body from the final trim line to the chassis line. In Fig. 1 the body is lifted off the buck BP at the end of the trim line and conveyed overhead directly to the chassis and deposited thereon at Z. In Fig. 2 the buck BP and the body are picked up at the exit end 62 of the trim line by means of a lift truck T and conveyed to the dotted line position shown at 91 where the body is lifted from the buck by means of the stack lifter U¹, conveyed and deposited on the chassis at point Z. It will be noted, see Figs. 1 and 10, that the large type lifter U¹ is adapted to span the aisle space between the trim line and chassis line, and is adjusted to such a height as not to impede the travel of the lift trucks T transversely beneath the arched frame.

*Assembly plant construction*

In Fig. 1 I have illustrated an assembly plant laid out for the purpose of assembling automobiles, this form and use of the invention being shown for the purpose of illustration. The plant need require but a ground floor with a suitable building H to house the equipment. Laid on the floor of the plant and preferably extending around three sides of the building are sections of gravity or anti-friction rollers R forming a continuous conveyor or trackway from the entrance point X to the exit point Y of the assembly line. This conveyor way forms, in the present instance, the main or chassis assembly line, designated as such in Fig. 1 for convenience. In the present embodiment the chassis assembly line is located closely adjacent the inner walls H¹, H² and H³ of the building, where assembly parts are to be positioned for the workmen at one side only of the assembly line. Where necessary for particular manufacturing requirements, a sufficient space may be provided between the chassis assembly line and the walls of the building to permit parts or material to be deposited at both sides of the line instead of at one side as shown by way of example in Fig. 1.

The chassis of the car may be assembled complete on the conveyor platform or buck CP, the several platforms being deposited empty at the entrance point X in succession by means of the lift truck T substantially in the same manner as shown in Fig. 4. When each platform CP reaches the point Z the chassis thereon has, during the course of its travel, been completely assembled and at this point the body is assembled on the chassis. When the car is completed the wheels thereof travel onto raised guideways N (Figs. 7, 11 and 12). At this point the platform CP is removed from supporting engagement with the chassis frame and is discharged and transferred to a point where it may be readily picked up by a lift truck and returned to the assembly line again.

As shown in Figs. 1, 7, 12 and 13, the conveyor sections R may be depressed at Q and projected laterally at an incline so that the platform will drop of its own accord from beneath the car as shown in full lines in Fig. 7, travel by gravity down the incline and out from beneath the runway N as shown in Fig. 1. The conveyor sections in the present instance extend at V (Figs. 1 and 13) through a short tunnel beneath a suitable section of removable flooring 60 and terminating in stops S (Fig. 7) at an opening W having an inclined approach to permit a truck T to be propelled into position whereby its lift platform L may be introduced beneath the platform (see Figs. 1, 7 and 13), pick it up and return it to the entrance X of the assembly line.

The body assembly line and trim line, where automobiles are to be assembled as in the present illustration of the invention, are preferably located intermediate the chassis assembly line, as shown in Fig. 1. These may comprise two parallel sub-assembly lines each made up of sections of gravity or anti-friction rollers forming conveyor ways or tracks R, as in the case of the main or chassis assembly line. At one end of the body assembly and trim lines is a transverse connecting conveyor section 61 whereby the empty platform or buck BP may be transferred from the end of the trim line at 62, after a completed body has been transferred therefrom to the chassis at Z, to the entrance end 63 of the body frame assembly line.

It will be understood that from the point 63 as the buck BP travels in the direction of the arrows down the sub-assembly line the frame of the body is assembled on the buck, and this operation is completed when the buck BP reaches the end of the line at 64. From this point the buck or platform BP with the body may be picked up by a lift truck and carried to a point (not shown) where the body is painted, lacquered or enameled, after which the body is returned on the buck by means of the truck and deposited at the entrance end 65 of the trim line. The buck BP, carrying the body, travels in the direction of the arrows along this subassembly line until it reaches the exit point 62 where the body is lifted from the buck, conveyed and deposited on the chassis at point Z on the chassis or main assembly line.

The chassis and body assembly lines, which may be termed the outer main and intermediate sub-assembly lines, are so located on the plant floor as to provide suitable aisle spaces therebetween at each longitudinal side of the intermediate assembly and at each end thereof. This is important to facilitate manipulation of the lift trucks T. Moreover, a predetermined longitudinal area is provided along the side of the chassis assembly line, which area is defined by the imaginary lines 66 (Fig. 1), for the positioning or distribution of platforms P along the assembly line. These platforms (see also Figs. 6, 17 and 18) support the material or parts to be assembled in the car. In like manner, at the opposite sides of the body and trim lines corresponding longitudinal areas are provided, which are defined respectively by imaginary lines 67 and 68 in Fig. 1. Within these areas are positioned or distributed along the body and trim assembly lines the platforms P which carry the material or parts to be assembled at the respective assembly lines.

The material or parts in boxes on the platforms P are carried from the freight car or storage plant through the doorway D on the lift truck platforms L, as shown at 69, 70, 71, 72 and 73 (Fig. 1). These platforms P are all deposited along the outer and intermediate assembly lines, within the areas 66, 67 and 68, in parallel relation but at an angle or slant to the assembly lines. The platforms P furthermore are placed so that the outer ends thereof face in the direction in which the material is brought to the assembly lines. This method has three important advantages:

(1) reduces the width of the aisles and the floor area required, (2) facilitates more rapid operation of the trucks by requiring a minimum of turning and enabling the trucks to be propelled directly beneath the platforms to remove them when empty and (3) provides working spaces at the sides and ends of the platforms to facilitate assembly work by the workmen.

*Sub-assemblies.*—At any required point along the main or intermediate assembly lines, depending upon the character of the machine or car being assembled, I may provide additional sub-assemblies, one thereof being shown at 92, Figs. 1 and 2. In the present instance the sub-assembly 92 is provided for completing the assembly of the motor unit. As will be later described (Fig. 3) the motors may be assembled in boxes at the point of manufacture, and shipped to the assembly plant. The boxed motors, which have been previously shipped, are carried into the assembly plant H on a lift truck T to the point 93 on a portable platform P. The sub-assembly 92 comprises in its preferred form spaced sections of anti-friction rollers R (Figs. 1, 2 and 9). A stack lifter U is positioned at the entrance end 92ᵃ of the assembly line 92. This lifter straddles the spaced trackways and extends longitudinally thereof. The motors may be lifted out of the box carried on the platform P at point 93 and deposited on another platform P shown in Fig. 9 which has previously been deposited on the roller trackways beneath the arched frame of the lifter. This platform is caused to travel over the roller sections R of the sub-assembly 92, as shown at 94 in Figs. 1 and 2, during which time motor parts, such as the clutch, etc., are assembled in the motor. This platform finally travels beneath a second stack lifter positioned at 95 crosswise of the sub-assembly line 92, and shown in Fig. 9. The completed motor is picked up by the stack lifter mechanism from platform P, conveyed and deposited on the chassis, as shown at the left in Fig. 9. The motor parts which are assembled in the motor unit along the sub-assembly line 92 are carried on portable platforms P disposed at the side of the assembly line at 96. After the motor units have been removed from the sub-assembly platform in the manner shown in Fig. 9 the empty platform is caused to travel to the exit end 97 of the conveyor ways 92 at which point it is picked up by a lift truck T.

*Sequence method of boxing or packing assembly parts and distribution at assembly plant*

As hereinbefore stated the present invention is shown, for the purposes of illustration, as applied to the assembling of automobiles. Where it is desired to assemble the parts of the car, at the main manufacturing plant, in boxes or containers which are shipped to another part of the country or to a foreign country and there unboxed and assembled in the machine, the invention may be divided into two phases. The first phase contemplates assembling the machine or car parts in boxes in accordance with a predetermined sequence, the assembling and boxing of the parts being preferably accomplished by means of an improved conveyor apparatus, shown in my copending application, Serial No. 120,303, filed July 3, 1926. The second phase contemplates the distribution of the boxes or crates of parts along the assembly line of the assembly plant in accordance with the sequence of assembly operations. Each box or crate contains the parts which are to be assembled on the car at a predetermined point on the assembly line.

In Figs. 3 to 5 inclusive, I have illustrated the conveyor method and apparatus which I prefer to employ for progressively assembling, boxing and transporting the parts at the point of shipment. It will be noted that this conveyor method and apparatus are also employed at the assembly plant (Figs. 1 and 2) for progressively assembling the car or machine. For the purposes of illustration, Figs. 3 to 5 inclusive show the method and apparatus as utilized for boxing motors for shipment, the same method of course being preferably employed in boxing or crating the other parts, such as springs, chassis sills and other frame parts, axles, wheels, rims, body panels, doors, etc.

Referring to Figs. 3 to 5 inclusive, the spaced roller conveyor ways R (above described) are laid in sections on the plant floor, and extend the required distance. Where heavy units, such as engines or motors, are being crated, the motors 98 may be conveyed to the proper point along the ways R by means of a gravity roll conveyor $R^2$ (Fig. 3). In handling such heavy units I prefer to employ a stack lifter U, described above, which is placed crosswise of the ways R and straddles the same in such manner as to permit the portable platforms P to travel freely on the ways R beneath the arched frame of the lifter.

The portable platforms P are deposited at the entrance end 99 of the conveyor ways R by means of a lift truck T. This lift truck is power driven and has the usual lift platform L which may be propelled into position beneath the platform P, lift it, and carry it into position to deposit it on the conveyor or trackways R. Such a truck is preferably constructed in accordance with my application Serial No. 118,584, filed June 25, 1926. It will be noted that the ways R are spaced apart so as to permit the load carrying wheels W beneath the lift platform L to be introduced therebetween enabling the forward end of the truck to be propelled far enough between the ends of the conveyor ways so that the platform P may be deposited directly thereon. It will be understood that when the electric lift truck T is introduced between the ways R the lift platform L is in its elevated position and hence carries the runners 19 of the portable platform above the gravity rolls. The lift platform is then lowered causing the runners 19 to rest on the gravity rollers 14. The truck is then backed out for a succeeding operation.

The bottom 101 of the box or crate is then built or placed on the portable platform P, see Fig. 4. Thence the platform is moved into position beneath the crane U. As shown in Fig. 3 the hoist unit 43 is propelled on the boom of the crane to the dotted line position, operated to pick up a motor 98, then propelled rearwardly to the full line position, and the motor deposited on the bottom 101 of the box. After the required number of motors have been deposited on the box bottom, the platform is moved forwardly on the conveyor ways and the workmen proceed to build up the box 102 around the assembled motors. When the platform P with the completed box or crate reaches the exit point 100 of the ways R, an electric lift truck is propelled into position between the spaced ways and beneath the platform. The lift platform L is elevated to raise the portable platform and its load from the ways; then the truck is backed out as shown in Fig. 5 and the box 102 carried directly to the freight car for transportation or to storage.

The box 102 thus contains assembly parts which are assembled on the car at the plant H (Figs. 1 and 2) at a predetermined point on the assembly line. Assuming this point is the eighth operating or assembly position or step, the box at the point of origin where constructed may be stenciled or stamped on the outside with a number such as "M8". When this box after shipment reaches the point of destination, namely the assembly plant, it is carried from the freight car, or storage room, on a portable platform P by means of a lift truck directly to the point on the assembly line where the eighth assembly operation is performed.

Referring to Figs. 1, 2, and 6, let it be assumed for the purposes of illustration, that the frame sills of the chassis are placed on the chassis assembly buck CP at operation 1; that other frame parts are assembled at operation 2; springs, shackles, etc., at operation 3; and axles and associated parts at operation 4. At the point of origin the respective parts for each of these assembly operations are assembled in separate boxes. The boxes for operation 1, containing for example chassis sills, may be marked F1; the boxes for operation 2, containing for example various frame parts, may be marked F2; the boxes for operation 3, containing for example springs, shackles and associated parts, may be marked S3; the boxes for operation 4, containing for example axles and associated parts, may be marked A4; etc. It will be seen, therefore that the parts are boxed at the point of origin in accordance with the sequence in which the car is to be assembled at the point of assembly (Figs. 1 and 2). Each box is designated with a number in the sequence which indicates that the parts contained therein are to be assembled on the car at a definite point in the sequence of assembled operations or steps.

It will be understood that Figs. 1, 2 and 6 are merely diagrammatic in illustrating the sequence of operations. Only a few of the parts to be assembled are indicated, while the order in which the parts are assembled may under actual conditions vary. Where other types of machines are to be assembled, such as trucks, threshing machines, etc., the same method may be employed in boxing the particular parts of the machine at the point of origin in accordance with the sequence in which they are to be assembled at the point of assembly.

Heretofore it has been the practice, especially in the automobile industry, to first build large boxes or crates of arbitrary size. The parts of the car were packed in these boxes by fitting as many parts as possible in a box. One large box or crate might contain most of the parts for a given car or machine, or might contain parts assembled at many different points on the assembly line, such as frame parts, motor parts, springs, radiators, etc. Thus at the point of destination it was necessary to have a large sorting space or room with gangs of workmen unboxing the parts, and sorting them out. Many handlings were necessary, resulting in confusion and great labor expense.

One of the most serious disadvantages in previous methods employed in car assembly has been in the handling of small miscellaneous parts, such as nuts, bolts, screws, etc. Such parts are required at practically every assembly operation, and are of various sizes and kinds. Heretofore, such parts were shipped without reference to operations where used, resulting in the necessity of sorting out the parts at the assembly plant. This required considerable labor expense, and constant trouble was encountered on assembly lines on account of the wrong parts being used by workmen or because the special parts necessary were not available or the workmen were supplied with the wrong bolts, nuts, etc.

Figure 19:
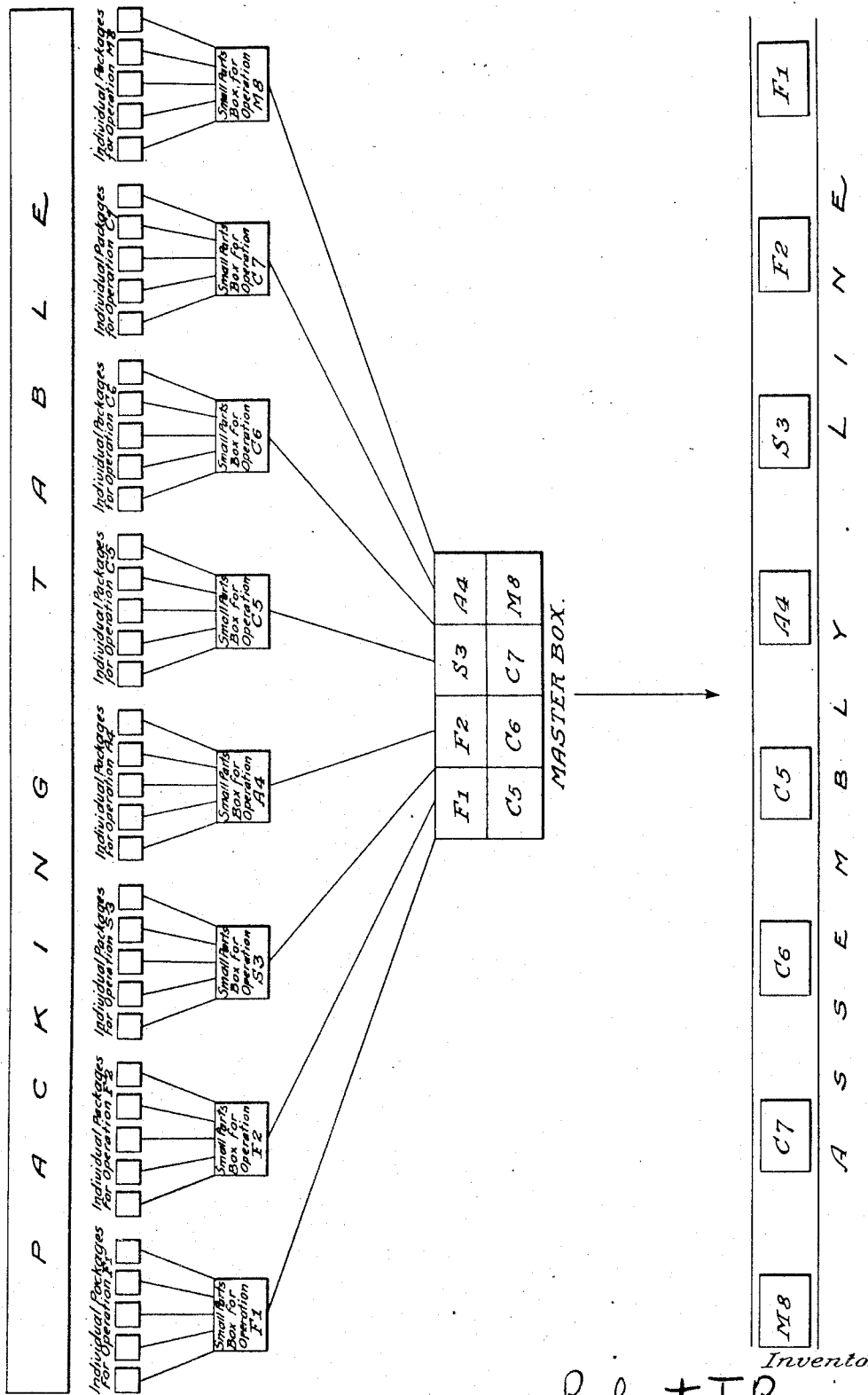
Fig. 19 is a diagrammatic view illustrating by diagram the manner in which small or miscellaneous parts for the various assembly operations are handled from the point of manufacture and shipment to the various operations on the assembly line of the assembly plant.

Referring to Fig. 19, I have shown diagrammatically in accordance with the present invention a method of handling such miscellaneous parts in accordance with the sequence of assembly operations. Assuming that the numbers F1, F2, to M8, in Fig. 2 represent eight assembly operations in sequence at the assembly plant, all of the miscellaneous parts, such as bolts, nuts, etc., for these eight operations are boxed or packed for shipment at the point of origin in the same sequence. Assuming, for illustration, that five different miscellaneous parts are employed at each of these operations, the parts of each kind are placed at the packing table (Fig. 19) in separate bags or containers, marked or tagged to indicate where each part goes on the machine. In such case there would be five individual packages of small parts for operations F1, F2, S3, etc., as shown in Fig. 19. The individual packages, constituting the group of small parts for each operation, are then packed in a box or container so that for the first eight operations designated there would be eight small parts boxes, each containing all the parts in suitable multiples for the particular operation. These small parts boxes or containers which may be stencilled or stamped on the outside with the number of the operation to which they pertain, may then be packed in a large master box.

The master box containing the segregated small parts, preferably in multiples for a given number of cars to be assembled, may be formed in accordance with the same method shown in Figs. 3 to 5 inclusive. The small parts boxes are assembled on a portable platform P traveling on spaced conveyor ways, and the master box or crate is built up around them.

In the foregoing description I have used eight operations merely for illustrative purposes, since in practice the master box may include parts for any preferred number of operations. The master box when assembled is handled in the manner shown in Fig. 5, and at destination is also transported to the assembly plant (Figs. 1 and 2) on a platform P carried by an electric lift truck. At the assembly plant the master box is broken open, and the individual small parts boxes or containers taken on a truck directly to the assembly line. Referring to Fig. 19, the small parts box F1 will be deposited at operation F1 (see also Fig. 2); box F2 at operation point F2; box S3 at operation S3; etc. It is then merely necessary for the workmen at each operation to open the small parts box, which will contain in separate units, bags or packages, clearly identified or tagged, the special parts required at the particular assembly operation.

The foregoing method eliminates handling and sorting of miscellaneous parts at the assembly plant, thereby saving time, labor and plant space. It avoids mistakes in the distribution of such parts, confusion and loss of time during assembly operations. It also saves a large amount of material which is lost or stolen, since each individual package will contain a given number of identical parts sufficient for carrying out the assembly of a certain number of cars. An accurate check on bolts, nuts, screws, washers, etc. may be kept which enables considerable savings in material alone over a period of time where, for instance, a relatively large number of cars, such as two hundred or more, are assembled per day.

Assembling of the car

*Chassis assembly.*—The method of assembling the car at the assembly plant is shown diagrammatically in Figs. 1 and 2. The empty platforms or bucks CP, upon which the chassis (in the case of automobiles) is assembled, are carried successively by means of electric lift trucks T and deposited on the conveyor ways R at the entrance end X of the assembly line. This is accomplished in the same manner as above described in detail in connection with the conveyor apparatus in Figs. 3 to 5 inclusive. The parts for each operation are also transported on portable platforms P by means of trucks T and deposited along the assembly line in staggered relation at a slant or angle, and facing in the same direction as the direction of travel of the bucks CP on the ways R. As the bucks CP travel along the assembly line the chassis is assembled by the workmen, as shown in Fig. 6.

As above described, a sub-assembly 92 may be provided for assembling special parts, such as clutches, this sub-assembly being parallel to the main assembly. The completed motors are taken successively from the platform 94 on the sub-assembly and deposited on the chassis by means of a stack lifter U. This operation is illustrated in Figs. 8 and 9.

In connection with the sub-assembly 92 it will be understood that an empty platform, or several of them, are first carried on a truck T to the entrance end 92ª of the sub-assembly and deposited on the ways R. This platform 94 is stationed beneath the boom of the stack lifter U. Thereupon a truck T deposits a platform at 93 carrying a box 102 packed with a number of motors (see also Figs. 3 to 5). The motors are successively hoisted from the box or crate and placed on platform 94, and as the latter is moved forwardly along the sub-assembly the motor parts are assembled in the motor. Upon reaching the position beneath the stack lifter U at 95 the motors are successively lifted from the sub-assembly to the main assembly and assembled upon successive chassis bucks CP as they travel forwardly (see Figs. 8 and 9).

From this point the partly assembled cars on the bucks or platforms CP may travel on the ways R through an enamel or paint oven after being first sprayed, and thence to the wheel and running board assemblies, illustrated in Figs. 1 and 2. At the point indicated "wheel assembly" may be a sub-assembly where, for instance, tires, rims and wheels are first assembled and then placed on the car. At the position marked "Running board assy." may be a suitable sub-assembly for running board parts.

Upon reaching the position Z (Figs. 1 and 2) the chassis is ready for the body to be assembled therewith. This operation will be described later under the sub-heading "Body and chassis assembly".

*Body assembly.*—As in the case of the chassis parts, the body parts, such as sills, panels, cowls, etc., indicated in Figs. 1 and 2, are preferably boxed or crated by the same method described above in connection with Figs. 3 to 5 inclusive. In those figures the method was illustrated in connection with the assembly for shipment of the motors, but this method of course applies to all parts. Where parts are not shipped from one place for assembly elsewhere, the crating or boxing of the parts for freight shipment would of course not be necessary.

The various body parts are carried on portable platforms P by means of lift truck T into the plant—through the doorway D for example—and are deposited along the body assembly line in the sequence in which the car body is built up or assembled. The platforms are deposited in the areas 67 and 68 in staggered relation at an angle facing in the same direction as the platforms P along the chassis line.

As shown in Figs. 1 and 2 the assembly operations commence at point 63. The body assembly platforms or bucks CP are first deposited by means of lift trucks T at point 65, and are caused to travel in the direction of the arrows to the end of the ways. In the form of the invention shown in Fig. 1 they are then moved successively on the cross roller ways 61 to the point 63. From this point, as the platforms BP are caused to travel in the direction of the arrows along the "Body assembly line", (Figs. 1 and 2) the framework of each body is progressively assembled on the buck BP. A few of the parts, such as sills, panels, cowls, etc., which make up the body are indicated in Figs. 1 and 2, but of course would vary in accordance with the particular type or model. At the exit end 64 the bucks BP carrying the partly assembled bodies are successively picked up by lift trucks T, and may be taken to the paint or enamel operation and thence returned and deposited successively at the entrance end 65 of the body trim line.

From point 65 the bucks BP are caused to travel successively along the trim line in a direction opposite to the direction of travel along the body assembly line, as shown by the arrows. On the body trim line the so-called trim parts are progressively assembled on the body during its travel, which completes the body assembly proper. Upon reaching the end 62 of the trim line opposite the stack lifter U¹ the body is completed and ready to be assembled on the chassis.

Referring to Fig. 2 it will be seen in this form of the invention that the parallel conveyor ways for the body assembly are open at both ends, the cross conveyor 61 of Fig. 1 being omitted. At the start of operations the empty bucks BP are successively deposited by trucks T directly at the entrance end 63 of the "Body assembly line", are successively removed by the trucks at the exit end 64, deposited again at the entrance end 65 of the "Body trim line" conveyor ways, and at the exit end 62 of the latter the bucks BP carrying the completed bodies are successively lifted from the spaced sections of antifriction rollers by means of one or more lift trucks T and propelled to the point 91 adjacent the smaller stack lifter U¹.

*Body and chassis assembly.*—Referring to Figs. 1 and 2, it will be seen that the completed bodies are successively lifted from the bucks BP by means of the portable crane mechanism U¹ and deposited on chassis, previously assembled on platforms CP, successively reaching the point Z opposite the crane U¹. This operation is shown in Fig. 10.

From point Z the wheels C of the car B travel onto raised parallel runways N, the assembly of the car being completed during this time by the assembly thereon of accessories or parts such as head lights, windshield wipers, etc. The purpose of causing the car to travel onto the runway supports N is to enable the chassis assembly platform CP, upon which the car has been assembled during the travel of the platform over the parallel roller ways R, to be ejected from beneath the car. This is accomplished, as above described, by depressing the ways R at Q and running them out from under the runways N. The bucks CP, therefore, successively drop out from under the chassis, as shown in Fig. 7, and travel by gravity a suitable distance as far as the stops S. At this point a lift truck T successively lifts the bucks CP off the ends of the roller ways R and returns them to the entrance end X of the main assembly line.

I claim:

1. The hereindescribed method of assembling cars or machines, which consists in supporting a succession of portable platforms with the legs of each platform resting on spaced parallel roller ways, moving the platforms over said ways while the cars are being assembled on the platforms, ejecting the platforms from beneath the cars at or adjacent the end of the assembly line, and lifting the platforms from beneath and conveying them independently on a lift truck to the entrance end of the roller ways.

2. The method of handling material during the process of assembling automobiles or the like, which consists in building up each automobile chassis or body progressively and supporting it during such assembly on a platform top disposed a substantial distance above the plant floor, moving the platforms in succession in a predetermined path along the assembly line while causing the legs of the platforms to travel over ways laid on the plant floor, removing each platform from supporting engagement beneath the automobile after assembly thereof, and removing each platform from the ways.

3. The method of handling material during the process of assembling automobiles or the like, which consists in building up each automobile chassis or body progressively and supporting it during such assembly on a movable portable platform having depending legs, independently moving the platforms in succession while causing the legs of each platform to travel on ways in a predetermined path along the assembly line, and ejecting each platform adjacent the end of the line from beneath the automobile without interferring with the travel of the latter.

4. The method of handling material during the assembly of the chassis and bodies of automobiles, consisting in separately supporting each chassis and body during the process of their assembly on an independently movable portable platform, causing the chassis assembly platforms to travel on ways, causing the body assembly platforms to travel substantially parallel thereto and in succession on ways, and lifting the bodies from the body assembly platforms at the end of the body assembly line onto the chassis assembly platforms before reaching the end of the chassis assembly line thereby to assemble the body and chassis of each car.

In testimony whereof I affix my signature.

ROBERT T. ROMINE.